United States Patent [19]

Tanaka et al.

[11] Patent Number: 4,733,330
[45] Date of Patent: Mar. 22, 1988

[54] WIRING-DEVICE MOUNTING STRUCTURE

[75] Inventors: Sadamasa Tanaka, Yokkaichi; Takao Ota, Tsu; Masaaki Nakamura, Ichishi, all of Japan

[73] Assignee: Matsushita Electric Works, Ltd., Osaka, Japan

[21] Appl. No.: 18,397

[22] Filed: Feb. 25, 1987

[30] Foreign Application Priority Data

Mar. 19, 1986 [JP] Japan .................................. 61-62767
Mar. 19, 1986 [JP] Japan .................................. 61-62768

[51] Int. Cl.$^4$ ............................................. H02B 1/10
[52] U.S. Cl. .................................. 361/356; 200/297; 248/DIG. 6; 248/221.4; 220/3.5; 220/3.8; 220/242; 361/360; 174/58; 174/66
[58] Field of Search .................. 292/80, 87, DIG. 38; 220/3.5, 3,8, 242, 306, 307; 174/53–56, 58, 66; 248/DIG. 6, 221.4, 27.1, 27.3; 200/293, 294, 296, 297; 361/346, 347, 350, 356–358, 360, 363, 376, 417, 419, 420, 429

[56] References Cited

U.S. PATENT DOCUMENTS

| | | |
|---|---|---|
| 3,197,549 | 7/1965 | Good . |
| 3,618,804 | 11/1971 | Krause .................................. 220/242 |
| 3,745,664 | 7/1973 | Altseimer .............................. 220/3.8 |
| 4,098,423 | 7/1978 | Marrero ................................ 248/27.3 |
| 4,163,882 | 8/1979 | Baslow . |
| 4,398,073 | 8/1983 | Botz .................................... 248/27.3 |

FOREIGN PATENT DOCUMENTS 1159537  12/1963 Fed. Rep. of Germany ........ 174/58

Primary Examiner—G. P. Tolin
Attorney, Agent, or Firm—Burns, Doane, Swecker & Mathis

[57] ABSTRACT

A wiring-device mounting structure wherein outer decorative and inner laying plates are coupled to each other through relatively short, hooked engaging projections on inner surface of the decorative plate which are engaged with mounds on the laying plate which are raised to be close at raised top face to the inner surface of the decorative plate when coupled and to provide at side wall a locking face for hooked ends of the projections, whereby the raised mounds positioned in coupling zone between the both plates can minimize coupling distance between them and also the length of the engaging projections, so as to maintain the projections to be highly durable.

6 Claims, 10 Drawing Figures

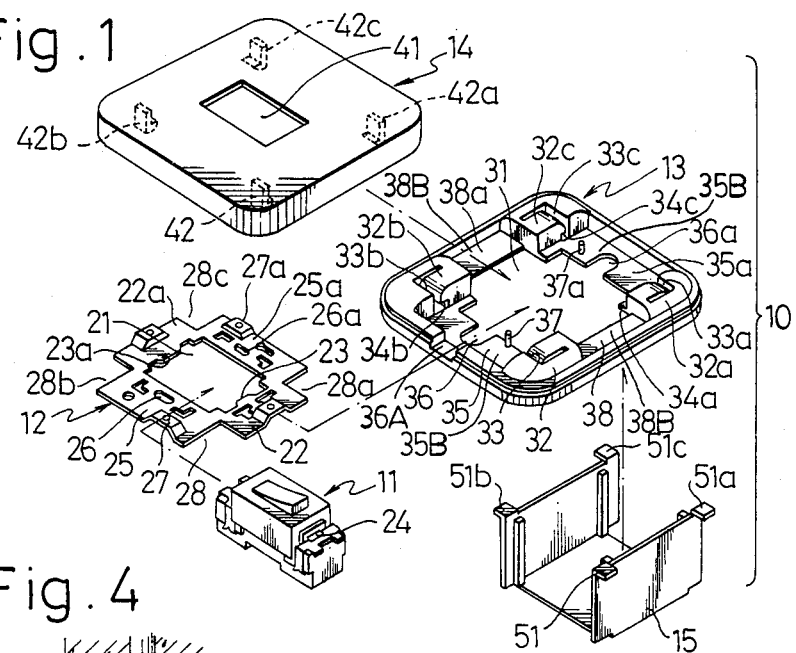
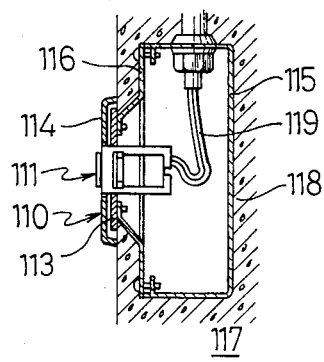
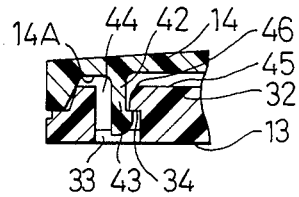
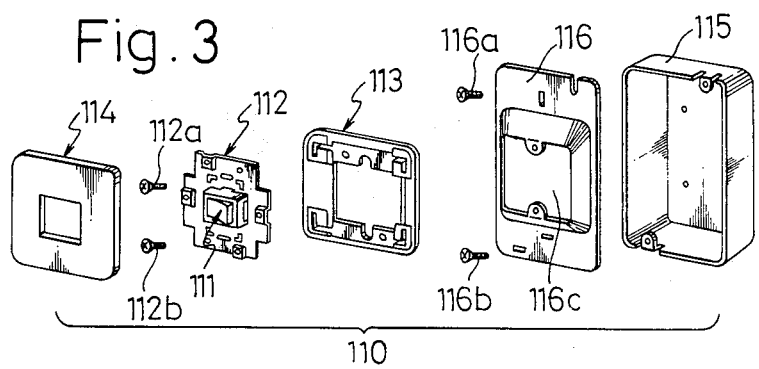

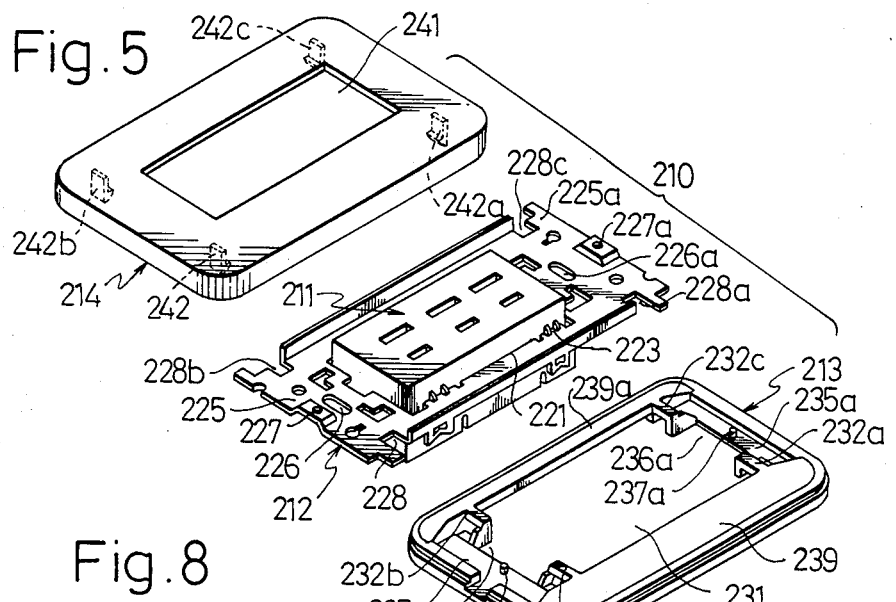
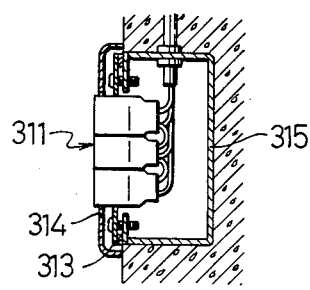
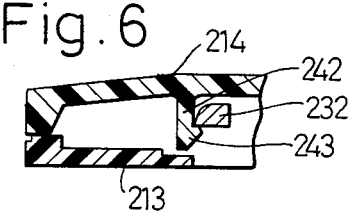
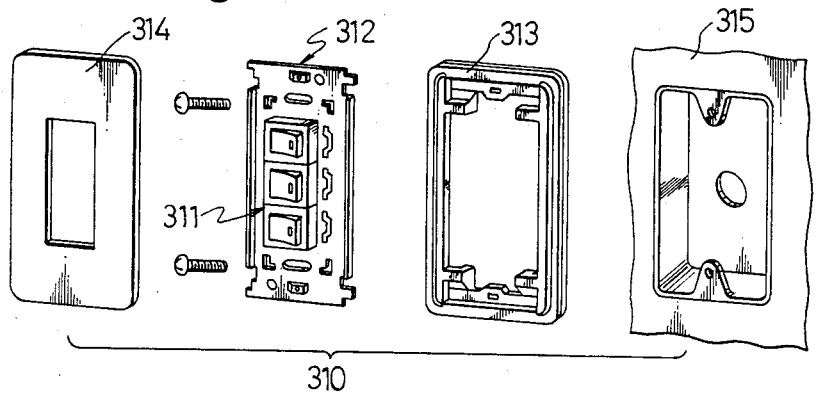

WIRING-DEVICE MOUNTING STRUCTURE

TECHNICAL BACKGROUND OF THE INVENTION

This invention relates to a mounting structure for wiring devices and having a decorative plate at outer front face.

The wiring-device mounting structure of the type referred to is effectively utilized in fixedly mounting such electric wiring devices as a wall switch, outlet, earthing terminal, antenna terminal, dimmer and the like to such a constructional member as a building wall.

DISCLOSURE OF PRIOR ART

Hitherto, there have been proposed various sorts of mounting structures for the wiring devices, and typical one of them is disclosed in U.S. Pat. No. 4,163,882 to F. M. Baslow, in which a mounting frame made integral with a wiring device is fastened with screws to a box embedded in a building wall and a decorative plate is screwed to the mounting frame. However, this structure has had such a problem that the screws for securing the decorative plate to the mounting frame have to be left as exposed on front face of the decorative plate to render its appearance unfavorable.

Disclosed in U.S. Pat. No. 3,197,549 to R. J. Good is a mounting structure in which the wiring device is integrally provided with a laying plate to be fitted to a building wall, a gripping member formed to have thin fingers at front wall is fittingly mounted in each of bores made at corners of the laying plate, and a decorative plate is provided on its inner wall with tear-drop shaped mating projections which can be gripped by the fingers of the gripping members, so as to have the decorative plate mounted to the laying plate. According to this arrangement, the mounting of the decorative plate to the laying plate achieved with the gripping members and mating projections requires no screw which is exposed on the front face of the decorative plate, and the mounting structure can be of an excellent appearance.

In this mounting structure of Good, however, there remain still such problems that, first, the inner surface of the decorative plate is spaced from the laying plate by a relatively large distance which renders the tear-drop shaped projections to be longer to cause their neck portions to become much thinner than the tear-drop portions thereof enough for rendering the projections to be less strong at the neck portions to be easily broken; second, the fingers of the gripping members made thin enough to be elastic are subjected to a downward stress when the projections are urged into the gripping members and also to an upward stress once the projections are held within the gripping members due to the tear-drop shape of the projections, so that the fingers become easily breakable; and third, the gripping members which are provided separately from the laying plate which in turn is formed to have bores for integrally mounting the gripping members onto the laying plate are rendering the manufacturing of the mounting structure to be complicated.

TECHNICAL FIELD OF THE INVENTION

A primary object of the present invention is, therefore, to provide a wiring-device mounting structure which does not expose to the exterior required coupling means between decorative and laying plates to provide a favorable appearance, and is still effective enough to maintain part on the decorative plate side of the coupling means to be highly durable.

According to the present invention, the above object is attained by a wiring-device mounting structure which comprises a mounting frame on which the wiring device to be installed onto a constructional member is mounted, a layer plate interposed between a surface of the constructional member and a peripheral part of the mounting frame, and a decorative plate having an aperture for allowing a major part of the wiring device on the mounting frame externally exposed and detachably secured through a coupling means to the laying plate with the mounting frame held between the laying plate and the decorative plate to cover the front face of the laying plate, the coupling means comprising relatively short engaging projections hooked at their ends and extended from inner surface of the decorative plate toward the laying plate, raised portions on the laying plate to be close to the inner surface of the decorative plate and means provided to the raised portions for locking thereto the hooked ends of the engaging projections.

According to the above arrangement, the raised portions of the laying plate which are forming part of the coupling means are so raised as to lessen the zone distance between the decorative and laying plates in their coupling zone, so that the length of the engaging projections of the decorative plate can be minimized to prevent them from becoming low in the mechanical strength. Yet, the locking means for these engaging projections causes their hooked ends only to be locked to the means without being subjected to any excessive stress. Accordingly, the coupling means can be effectively prevented from being readily broken and the mounting structure can be improved in the durability.

Other objects and advantages of the present invention shall be made clear in the following description of the invention detailed with reference to preferred embodiments shown in accompanying drawings.

BRIEF EXPLANATION OF THE DRAWINGS

FIG. 1 is an exploded perspective view of an embodiment of a wiring-device mounting structure according to the present invention;

FIG. 2 is a fragmentary sectional view as magnified at a coupling zone of the mounting structure of FIG. 1;

FIG. 3 is an exploded perspective view of another embodiment of the mounting structure according to the present invention.

FIG. 4 is a schematic sectional view showing a state where the structure of FIG. 3 is installed as embedded in a constructional member;

FIG. 5 is an exploded perspective view of still another embodiment of the mounting structure according to the present invention;

FIG. 6 is a fragmentary sectional view as magnified at a coupling zone of the mounting structure of FIG. 5;

FIG. 7 is an exploded perspective view of a further embodiment of the mounting structure according to the present invention;

FIG. 8 is a schematic sectional view showing a state where the structure of FIG. 7 is installed as embedded in a constructional member.

Figure 9:
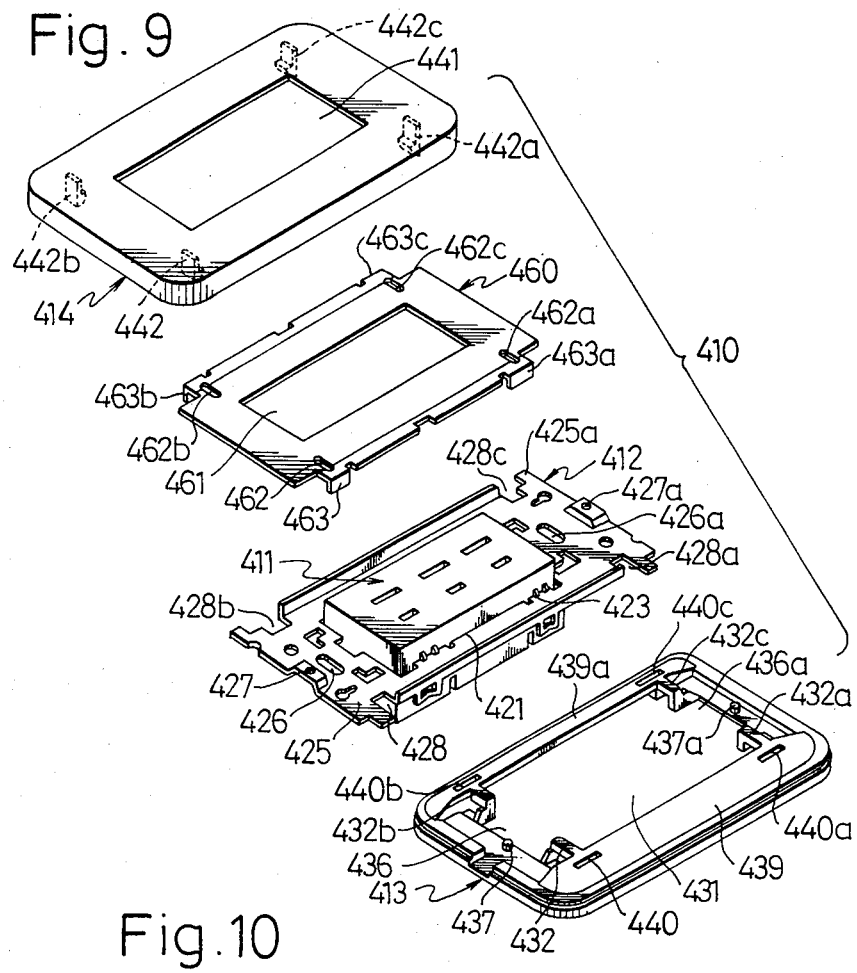
FIGS. 9 and 10 are exploded perspective views of further different embodiments of the mounting structure according to the present invention.

While the present invention shall now be described with reference to the preferred embodiments shown in the drawings, it should be understood that the invention is not to limit the invention only to the particular embodiments shown but rather to cover all alterations, modifications and equivalent arrangements possible within the scope of appended claims.

DISCLOSURE OF PREFERRED EMBODIMENTS

Referring to FIG. 1, there is shown a mounting structure 10 according to the present invention for installing a wiring device 11 onto a surface of a constructional member, such as a building wall surface. The wiring device 11 is exemplified by a wall switch in this embodiment of FIG. 1, but the present invention is applicable to any other wiring device such as an electrical outlet, grounding terminal, antenna terminal, dimmer or the like.

The mounting structure 10 comprises a mounting frame 12 made of a metallic material for mounting directly thereto the wiring device 11, a laying plate 13 made of a plastic material and disposed between the mounting frame 12 and the constructional member as laid substantially directly on the wall surface while carrying thereon the mounting frame 12, and a decorative plate 14 made of a plastic material for covering front side face of the laying plate 13 with the mounting frame 12 interposed between them. The structure 10 may include, if required, a protective frame 15 embedded in the constructional member to enclose therein the wiring device 11.

More specifically, the wiring device 11 is preferably made to be of a modular dimension so as to have the same outer dimensions throughout a variety of the devices (for example, wall switches, outlets and the like), and the mounting frame 12 has a mounting opening 21 adapted to the modular dimension for receiving therein at least a single wiring device. Two opposing side parts 22 and 22a of this mounting frame 12 are provided with fixing tongues 23 and 23a extended from inner opposing edges toward the center of the mounting opening 21, respectively, so that the wiring device 11 inserted in the mounting opening 21 will be fixed therein with these tongues 23 and 23a snap-engaged in recesses 24 and 24a at oposing side faces of the device 11 (while only one of which recesses is seen in the drawing). The wiring device 11 is thereby coupled to the mounting frame 12, while two other opposing side parts 25 and 25a of the mounting frame 12 are provided with slots 26 and 26a lying in the longitudinal direction of the side parts, and with round holes 27 and 27a which are positioned symmetrical with respect to the center of the mounting opening 21. Notches 28, 28a, 28b and 28c are provided in four corners of the mounting frame 12.

The laying plate 13 is formed substantially in a rectangular frame shape rounded at four corners and has a large opening 31 in the center, on the peripheral side edges of which the mounting frame 12 can be seated. In the illustrated embodiment, the laying plate 13 is formed to have at four corners mounds 32, 32a, 32b and 32c which are bulgingly raised to be closer to the inner face of the decorative plate 14 and are aligned at their inner edges with edges of the notches 28 to 28c of the mounting frame 12. The mounds 32 to 32c are provided respectively with engaging slots 33, 33a, 33b and 33c which are penetrating through the mounds in their thickness direction, while engaging a plurality of locking surfaces defined by steps 34, 34a, 34b and 34c. Those steps face downwardly and are provided on portions of peripheral walls of the engaging slots. The laying plate 13 also has opposing side parts 35 and 35a which correspond to the side parts 25 and 25a of the mounting plate 12, and notches 36 and 36a are provided in the side parts 35 and 35a in alignment with the slots 26 and 26a of the mounting plate 12, while positioning pins 37 and 37a are erected on the side parts 35 and 35a for engagement in the round holes 27 and 27a of the mounting plate 12 when the latter is placed on supporting surfaces 35B, 38B defined by the side parts 35, 35a, 38, 38a of the laying plate 13. Further, the other side parts 38 and 38a of the laying plate 13 which correspond to the side parts 22 and 22a of the mounting plate 12 are configurated to carry the side parts 22 and 22a respectively between the mounds 32 and 32a and 32b and 32c.

The decorative plate 14 which is formed in a thin box shape opened toward the laying plate 13 is provided in the center with an opening 41 through which a major front face part of the wiring device 11 mounted in the mounting frame 12 is externally exposed. The decorative plate 14 is provided on the inner face 14A with projections 42, 42a, 42b and 42c which are hook-shaped at their downward extended free ends 43, for insertion into the engaging slots 33 to 33c in the mounds 32 to 32c of the laying plate 13. When the decorative plate 14 is coupled to the laying plate 13, as seen best in FIG. 2, the hooked ends 43 of the projections 42 and 42c of the plate 14 are brought into locking engagement with the steps 34 in the slots 33 to 33c of the mounds 32 to 32c of the plate 13. This engagement occurs after the projections 42 to 42c are deflected slightly outward to the peripheral side of the decorative plate 14 when passing through relatively narrow inlets 44 of the respective slots 33 to 33c. The engagement occurs after the hooks 43 pass completely through the inlets 44. When the decorative plate 14 is thus coupled to the laying plate 13, the distance between the inner surface of the decorative plate 14 and an upper surface 45 of the mounds 32 to 32c of the laying plate 13 is minimized in coupling zones between the both plates 13 and 14, and correspondingly the distance between the inner surface of the decorative plate 14 and the locking steps 34 to 34c of the laying plate 13 is minimized. Consequently, the engaging projections 42 to 42c extending from the decorative plate 14 can be minimized in length to maintain sufficient strength thereof. One side wall of the respective inlets 44 of the engaging slots 33 to 33c is preferably curved at the upper corner edge 46 so that the hooked ends 43 of the engaging projections 42 to 43c can be smoothly guided into the inlets 44. The locking engagement between the hooked ends 43 of the projections 42 to 42c and the steps 34 of the mounds 32 to 32c the decorative plate 14 to be detached from the laying plate 13 upon application of a releasing force by means of a suitable tool inserted into a recess 36A formed in an outer edge of the laying plate.

The protective frame 15 which is shown here as U-shaped to be accommodated in a recess made in the constructional member is provided at upper end edges of both of its side wall parts with lugs 51, 51a, 51b and 51c located respectively at longitudinal ends of the side wall parts. The lugs can be engaged in receiving portions (not shown) provided on a side of the laying plate 13 abutting front surface of the constructional member so that the protective frame 15 can be coupled to the laying plate 13.

References shall next be made to the mounting procedure of the mounting structure 10 to the constructional member according to the present invention. The construction member is usually formed to have a recess for installing the wiring device or devices either in the case of wooden or concrete building, while the mounting structure 10 of the embodiment of FIGS. 1 and 2 is suitable for use in installing the wiring device 11 with respect to the wooden building. In this case, the laying plate 13 is integrally joined with the protective frame 15 as required. The mounting frame 12 is joined with the wiring device 11 with the tongues 23 and 23a of the frame 12 fitted in the recesses 24 and 24a of the wiring device 11. Then the mounting frame 12 is seated on the laying plate 13 by inserting the positioning pins 37 and 37a of the laying plate 13 into the holes 27 and 27a of the mounting frame 12. Then, the laying plate 13 carrying the frame 12 as well as the wiring device 11 is brought into engagement at rear side surface with peripheral wall surface around the recess made in the wooden constructional wall, into which recess the protective frame 15 if employed is inserted. Set screws (not shown) are driven through the slots 26 and 26a of the mounting frame 12 and the notches 36 and 36a of the laying plate 13 into the wooden building wall, thereby the wiring device 11, mounting frame 12 and laying plate 13 can be installed onto the building wall as a unit. Thereafter, the projections 42 to 42c of the decorative plate 14 are inserted into the engaging slots 33 to 33c in the mounds 32 to 32c of the laying plate 13 to be fixedly fitted thereto, with their hooked ends 43 locked to the steps 34 to 34c of the engaging slots 33 to 33c. The decorative plate 14 can cover the mounting frame 12 and laying plate 13, so that the wiring deivce 11 only is externally exposed at its front face through the opening 41. At this stage, the installation of the wiring device 11 to the building wall is completed.

Referring to FIGS. 3 and 4, there is shown a mounting structure 110 which is suitable for use in intalling the wiring device in a recess made in a concrete building wall, in which substantially the same constitutent members as those in the embodiment of FIGS. 1 and 2 are denoted by the same reference numerals but added by 100. In the present embodiment, an ordinary protective frame 115 of a rectangular box shape for two or more of the wiring devices is employed if desired, and a cover plate 116 having a central opening 116c for adapting the protective frame 115 to the size of mounting frame 112 for a single wiring device 111 is secured to the protective frame 115 by screws 116a and 116b. By driving fixing screws 112a and 112b into threaded holes of the cover plate 116 from the side of the mounting frame 112, an assembly of the wiring device 111, mounting frame 112 and laying plate 113 can be mounted in a recess 118 made in a concrete building wall 117 while the wiring device 111 is suitably connected to conductor wires 119 preliminarily embedded in the building wall 117. In an event where the protective frame 115 embedded in the concrete building wall 117 is designed to carry three modular dimensioned wiring devices, it is then preferable to have the central opening 116c of the cover plate 116 made to be corresponding in size to the single wiring device (as in the illustrated embodiment) for the purposes of providing dust and moisture preventing fucntions to the wiring device 111. Other arrangements and operations of the present embodiment are substantially the same as those of the embodiment of FIGS. 1 and 2.

Shown in FIGS. 5 and 6 is a mounting structure 210 which is adapted for use with three outlets employed as the wiring device, in which substantially the same constituent members as those of the embodiment of FIGS. 1 and 2 are denoted by the same reference numerals but added by 200. In the present embodiment, the wiring device 211 comprising three outlets is of an elongated rectangular shape, and a mounting frame 211, laying frame 213 and decorative frame 214 are respectively made in a correspondingly elongated shape. Coupling between the wiring device 211 and the mounting frame 212 is carried out at longitudinally opposing ends of the wiring device 211. The laying frame 213 is provided along both longitudinal side parts respectively with each of longitudinally extended mounds 239 and 239a raised inward and each having a pair of bridge-shaped mound extensions 232 and 232a or 232b and 232c adjacent both longitudinal ends of the mounds 239 and 239a as inwardly extended from the topmost raised edge. An opening 241 of the decorative plate 214 is made to be also elongated to externally expose a front face of the wiring device 211. In the present embodiment, engaging projections 242, 242a, 242b and 242c provided on the inner face of the decorative frame 214 are engaged at their hooked ends 243 to the rear faces of the mound extensions 232 and 232c, respectively. In the present embodiment, the longated mounting frame 211 is seated only at its longitudinal ends on the laying frame 213. Other arrangement and operation of the present embodiment are substantially the same as those of the embodiment of FIGS. 1 and 2.

There is shown in FIGS. 7 and 8 a mounting structure 310 in still another embodiment which is intended for use with a wiring device in the form of three modular dimensioned wall switches and is very similar to the embodiment in particular of FIGS. 5 and 6, whereas the present embodiment is different from that of FIGS. 5 and 6 in that a mounting frame 312 is designed to carry the three wall switches which are separately prepared and a protective frame 315 is, for example, of a box shape so as to allow the wiring device to be mounted also on a concrete building wall. Other arrangement and operation of the present embodiment are substantially the same as those of the embodiments of FIGS. 1 and 2 and of FIGS. 5 and 6.

Referring to FIG. 9, there is shown a mounting structure 410 in a still further embodiment which is more fireproof, while the structure is similar to that of the embodiment in particular of FIGS. 5 and 6. In the drawing, substantially the same constituent members as those of FIGS. 5 and 6 are denoted by the same reference numerals but added by 200. In contrast to the embodiment of FIGS. 5 and 6, the mounting structure 410 comprises additionally a fire resistive plate 460 interposed between a mounting frame 412 and a decorative frame 414, and this plate 460 has an opening 461 of the same shape as an opening 441 of the decorative frame 414, through which opening 461 a wiring device 411 can be passed. The fire resistive plate 460 is formed to have at four corners slots 462, 462a, 462b and 462c at positions corresponding to engaging projections 442, 442a, 442b and 442c provided on the inner face of the decorative plate 414, into which slots the projections can be inserted. The fire resistive plate 460 is also provided at its four corners with engaging lugs 463, 463a, 463b and 463c which are engaged in slits 440, 440a, 440b and 440c provided in the vicinity of both longitudinal ends of raised mounds 439 and 439a of a laying plate 413. In this case, only by passing the engaging projections 442 to 442c of the decorative plate 414 through the slots 462 to 462c of the fire resistive plate 460 and through notches 428 to 428c of the mounting frame 412, and by engaging the projections to bridge-shaped extrusions 432 to 432c of the laying plate 413, the fire resistive plate 460 can be seated on the laying plate 413 and the fire resistive plate 460 can be incorporated without any separate fixing means. It will be appreciated also in the present embodiment that the mounting structure having the fireproofness enables the length of the engaging projections 442 to 442c to be minimized and the relatively high strength of the engaging projections to be maintained. Other arrangement and operation of the present embodiment are substantially the same as those in the embodiments of FIGS. 5 and 6 and of FIGS. 1 and 2.

Figure 10:
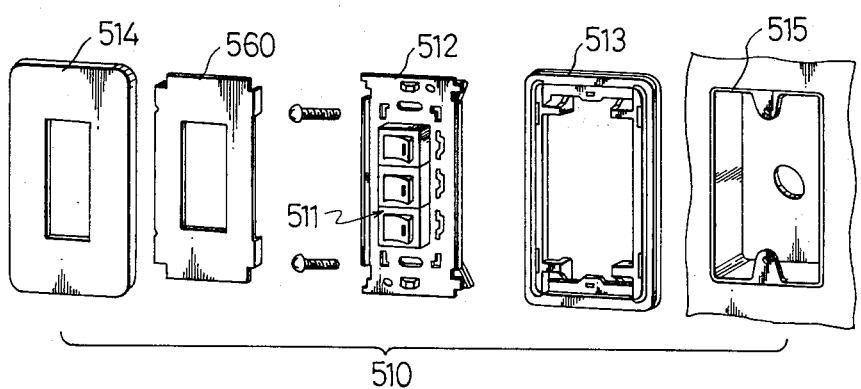

A still another embodiment of FIG. 10 employing also a fire resistive plate 560 is different from that of FIG. 9 only in that a mounting frame 512 is designed to carry three modular dimensioned wiring device prepared separately from one another, and a box-shaped protective frame 515 is employed. Other arrangement and operation of the present embodiment are substantially the same as those of the embodiments of FIGS. 9, FIGS. 5 and 6 and FIGS. 1 and 2, including the arrangement for coupling a laying frame 513 to a decorative plate 514.

What is claimed as our invention is:

1. A wiring device mounting structure comprising a mounting frame on which a wiring device is mounted for installation in a construction member, a laying plate interposed between said mounting frame and a mounting surface of said construction member, and a decorative plate having an opening therein for exposing a portion of said wiring device to the exterior, said mounting frame disposed between said laying plate and said decorative plate, said decorative plate covering a front face of said laying plate, said laying plate including support surface means facing an inner surface of said decorative plate, said mounting frame supported on said support surface means, said laying plate including raised portions disposed inside of an outer periphery of said laying plate and extending toward said inner surface of said decorative plate, said raised portions forming immovably rigid locking surfaces facing away from said inner surface and cam surfaces disposed in front of respective locking surfaces, the distance between said locking surfaces and said inner surface being less than the distance between said support surface means and said inner surface, a plurality of short locking projections disposed on said inner surface and extending toward said laying plate, free ends of said projections forming hooks and being engageable with said cam surfaces to be flexed sidewardly thereby until said hooks pass rearwardly beyond said locking surfaces and rebound to become superimposed behind said locking surfaces in manner requiring that said hooks be displaced sidewardly by a tool in order to remove said decorative plate forwardly from said laying plate, an outer edge of said laying plate including a recess arranged to receive a tool inserted between said outer edge and an outer edge of said decorative plate for flexing said decorative plate in a manner displacing adjacently disposed ones of said hooks sidewardly and out of superimposed relationship with said locking surfaces.

2. A mounting structure according to claim 1, which further comprises a protective frame embedded in said construction member for enclosing therein said wiring device, and a cover plate coupled to said protective frame and having a central opening accommodating the wiring device, said mounting frame being coupled to said cover plate.

3. A mounting structure according to claim 1, wherein said mounting frame is of an elongate shape for supporting three wiring devices, and said laying and decorative plates are also of a corresponding elongate shape.

4. A mounting structure according to claim 1, wherein each of said raised portions on said laying plate comprises a mound raised continuously along the length of a side part of the laying plate, and mound extensions extended from each of said mounds and forming said locking surfaces.

5. A mounting structure according to claim 4, wherein said mound extensions are provided in the form of bridge-shaped inward extensions of said continuous mound, said bridge-shaped extensions form at their rear face said locking surfaces.

6. A mounting structure according to claim 1, which further comprises a fire resistive plate disposed between said mounting frame and said decorative plate said fire resistive plate provided with holes through which said engaging projections of said decorative plate are passed and with engaging lugs, and said laying plate is provided with slits in which said lugs are engaged.

* * * * *